(12) United States Patent
Dergachev

(10) Patent No.: US 8,908,738 B2
(45) Date of Patent: Dec. 9, 2014

(54) RING RESONATOR WITH A HOLOGRAPHIC REFLECTOR

(75) Inventor: Alex Dergachev, Acton, MA (US)

(73) Assignee: Physical Sciences, Inc., Andover, MA (US)

(*) Notice: Subject to any disclaimer, the term of this patent is extended or adjusted under 35 U.S.C. 154(b) by 0 days.

(21) Appl. No.: 13/251,794

(22) Filed: Oct. 3, 2011

(65) Prior Publication Data

US 2012/0081769 A1 Apr. 5, 2012

Related U.S. Application Data

(60) Provisional application No. 61/389,061, filed on Oct. 1, 2010.

(51) Int. Cl.
*H01S 3/083* (2006.01)
*G02B 5/32* (2006.01)
*H01S 3/08* (2006.01)
H01S 3/081 (2006.01)
H01S 3/113 (2006.01)

(52) U.S. Cl.
CPC .............. *G02B 5/32* (2013.01); *H01S 3/08031* (2013.01); *H01S 3/083* (2013.01); *H01S 3/0812* (2013.01); *H01S 3/113* (2013.01)
USPC ............................................ 372/94; 359/27

(58) Field of Classification Search
CPC ..... H01S 3/083; H01S 3/113; H01S 3/08031; H01S 3/0812; G02B 5/32
USPC ................. 372/94, 95, 97, 93, 92; 359/27, 35
See application file for complete search history.

(56) References Cited

U.S. PATENT DOCUMENTS

| | | | |
|---|---|---|---|
| 5,121,398 A * | 6/1992 | Rao ................................ 372/20 |
| 5,260,953 A * | 11/1993 | Rowe ............................. 372/20 |
| 6,856,641 B2 | 2/2005 | Ksendzov |
| 6,928,209 B2 | 8/2005 | Su et al. |
| 6,959,028 B2 | 10/2005 | Jones |
| 2002/0034198 A1* | 3/2002 | Masuda ............................ 372/5 |
| 2002/0045104 A1* | 4/2002 | Efimov et al. ..................... 430/2 |
| 2004/0047375 A1* | 3/2004 | Rodin et al. .................... 372/10 |
| 2004/0136412 A1 | 7/2004 | Jones |
| 2004/0184490 A1* | 9/2004 | Hwu ............................... 372/21 |
| 2006/0256827 A1* | 11/2006 | Volodin et al. ........... 372/50.121 |
| 2010/0091370 A1 | 4/2010 | Mahrt et al. |
| 2011/0164299 A1 | 7/2011 | Morton et al. |

OTHER PUBLICATIONS

Jacobsson, B., et al., "Narrowband and tunable ring optical parametric oscillator with a volume Bragg grating," Optics Letters, vol. 32, No. 22, Nov. 15, 2007, pp. 3278-3280.

Ciapurin, I.V., et al., "Modeling of Gaussian beam diffraction on volume Bragg gratings in PTR glass," Practical Holography XIX: Materials and Applications, Proc. of SPIE, vol. 5742, 2005, pp. 183-194.

(Continued)

*Primary Examiner* — Tuan Nguyen
(74) *Attorney, Agent, or Firm* — Proskauer Rose LLP

(57) ABSTRACT

A laser device includes a pump source, a ring resonator, a gain medium disposed in the ring resonator, and a holographic output coupler to partially transmit the laser radiation. The gain medium is configured to receive radiation from the pump source and generate laser radiation.

16 Claims, 9 Drawing Sheets

(56) References Cited

OTHER PUBLICATIONS

Dergachev, A., et al., "High power CW Tm: YLF laser with a holographic output coupler," Optical Society of America, 2003, 2 pages.

Dergachev, A., "Pulsed, single-frequency, ring laser with a holographic output coupler," Optical Society of America, Optics Express. vol. 19, No. 7, Mar. 28, 2011, pp. 6797-6806.

Jacobsson, B., et al., "Single-longitudinal-mode Nd-laser with a Bragg-grating Fabry-Perot cavity," Optical Society of America, Optics Express, vol. 14, No. 20, Oct. 2, 2006, pp. 9284-9292.

Jacobsson, B., et al., "Tunable Yb:KYW laser using volume Bragg grating in s-polarization," Applied Physics B, vol. 91, 2008, pp. 85-88.

Jelger, P., "Efficient narrow-linewidth volume-Bragg grating-locked Nd:fiber laser," Optical Society of America, Optics Express, vol. 15, No. 18, Sep. 3, 2007, pp. 11336-11340.

Jelger, P., et al., "Narrow linewidth high output-coupling dual VBG-locked Yb-doped fiber laser," Optical Society of America, Optics Express, vol. 18, No. 5., Mar. 1, 2010, pp. 4980-4985.

Kogelnik, H., "Coupled Wave Theory for Thick Hologram Gratings," The Bell System Technical Journal, vol. 48, No. 9, Nov. 1969, pp. 2909-2947.

Pavel, N., et al., "Enhancing performances of a passively Q-switched Nd:YAG/Cr4+:YAG microlaser with a volume Bragg grating output coupler," Optical Society of America, Optics Letters, vol. 35, No. 10, May 15, 2010, pp. 1617-1619.

Tsai, T-Y., et al., "Q-switched 2-um lasers by use of a Cr2+:ZnSe saturable absorber," Applied Optics, vol. 40, No. 36, Dec. 20, 2001, pp. 6633-6637.

Häggström, I., et al., "Monolithic Bragg-locked Nd:GdVO4 laser," Optical Society of America, Optics Express, vol. 15, No. 18, Sep. 3, 2007, pp. 11589-11594.

Hellström, J.E., et al., "Quasi-two-level Yb:KYW laser with a volume Bragg grating," Optical Society of America, Optics Express, vol. 15, No. 21, Oct. 17, 2007, pp. 13930-13935.

Henriksson, M., et al., "Mode spectrum of Multi-longitudinal mode pumped near-degenerate OPOs with volume Bragg grating output couplers," Optical Society of America, Optics Express, vol. 17, No. 20, Sep. 28, 2009, pp. 17582-17589.

Jelger, P., et al., "High-power linearly-polarized operation of a cladding-pumped Yb fibre laser using a volume Bragg grating for wavelength selection," Optical Society of America, Optics Express, vol. 16, No. 13, Jun. 23, 2008, pp. 9507-9512.

Jelger, P., et al., "Highly efficient temporally stable narrow linewidth cryogenically cooled Yb-fiber laser," Optical Society of America, Optics Express, vol. 17, No. 10, May 11, 2009, pp. 8433-8438.

Moser, C., et al., "Self-aligned non-dispersive external cavity tunable laser," Optical Society of America, Optics Express, vol. 16, No. 21, Oct. 13, 2008, pp. 16691-16696.

Seger, K., et al., "Tunable Yb:KYW laser using a transversely chirped volume Bragg grating," Optical Society of America, Optics Express, vol. 17, No. 4, Feb. 16, 2009, pp. 2341-2347.

Jacobsson, B., et al., "Single-longitudinal-mode Nd-laser with a Bragg-grating Fabry-Perot Cavity: erratum," Abstract: an error in the equation for the effective optical cavity length of a Bragg grating is corrected. Optical Society of America, Optics Express, vol. 15, No. 15, Jul. 23, 2007, p. 9387.

Mills, P., et al., "Single mode operation of 1.55 μm semi-conductor laser using a volume holographic grating," Electronics Letters, vol. 21, No. 15, Jul. 18, 1985, pp. 648-649.

* cited by examiner

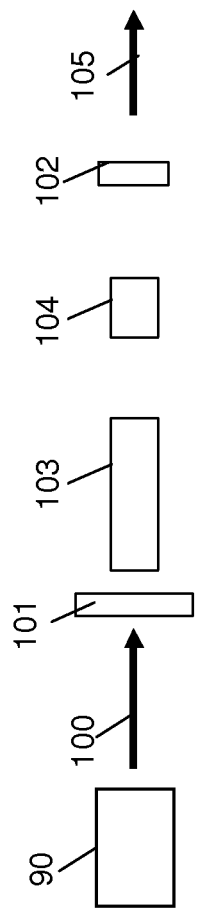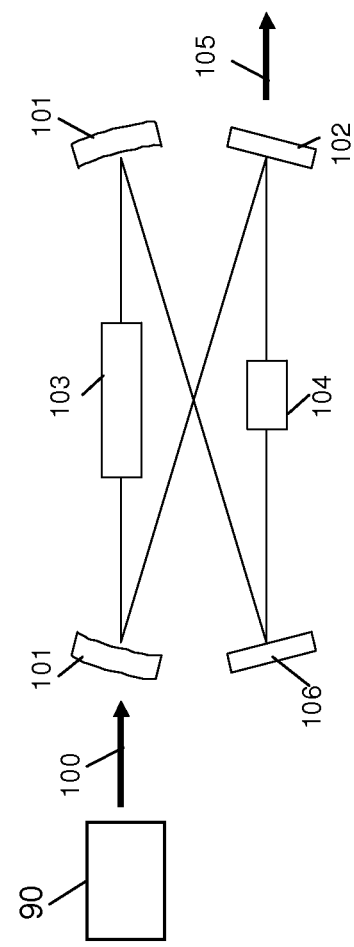
Figure 1A (Prior art)
Figure 1B (Prior art)

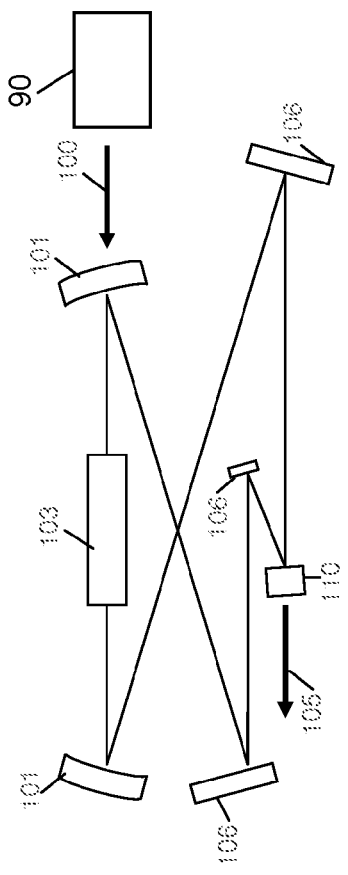
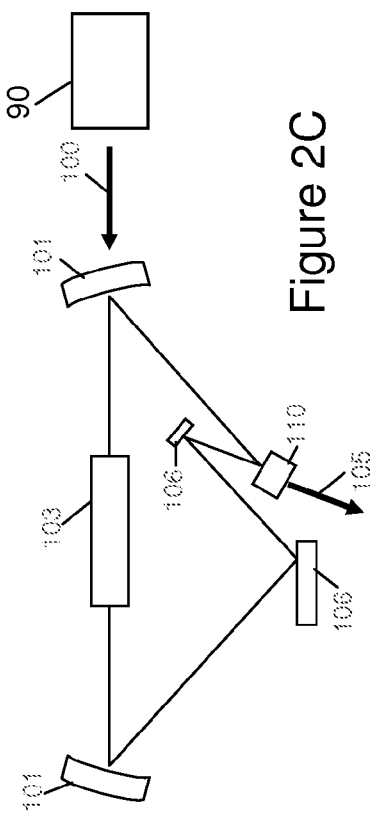
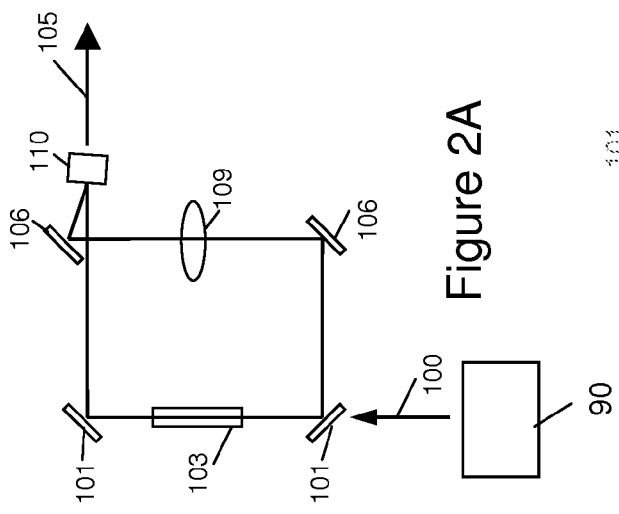
Figure 2A
Figure 2B
Figure 2C

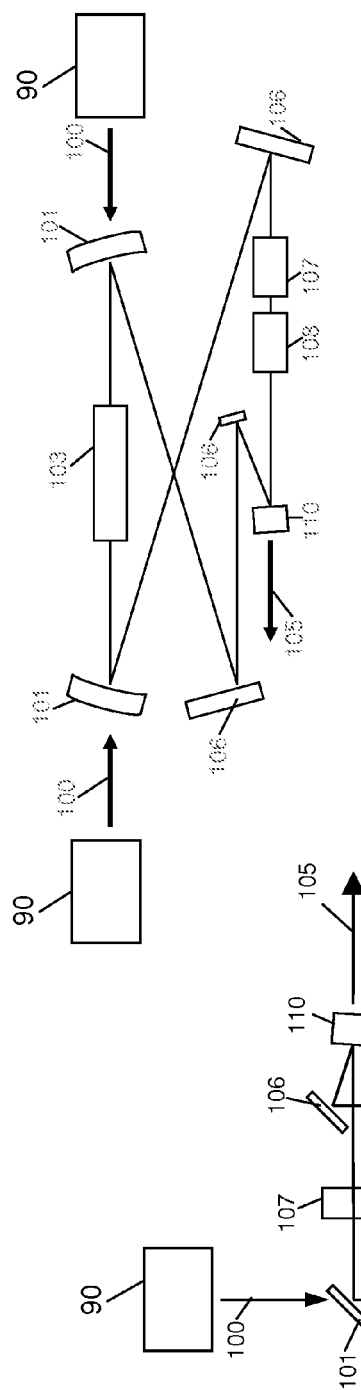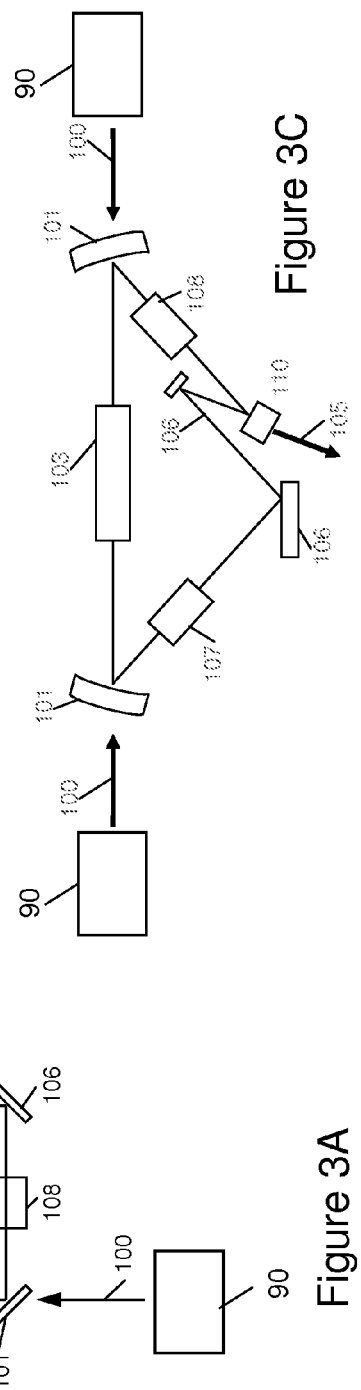

RING RESONATOR WITH A HOLOGRAPHIC REFLECTOR

CROSS REFERENCE TO RELATED APPLICATION

This application claims the benefit of and priority to U.S. provisional patent application No. 61/389,061 filed Oct. 1, 2010, the entire disclosure of which is herein incorporated by reference.

GOVERNMENT RIGHTS

The invention was made with government support from the National Aeronautics and Space Administration under grant no. NNX10CE95P. The government may have certain rights in the invention.

FIELD OF THE INVENTION

The invention relates generally to a spectrally-selective, ring laser resonator with a holographic reflector (e.g., an output coupler or a high reflector), and more particularly, to a Q-switched ring resonator with holographic output coupler that generates single-frequency laser pulses at a specific wavelength with a pulsewidth range from 10 to 500 ns, and more specifically, a long laser pulsewidth from 100 to 300 ns.

BACKGROUND

Passive Q-switching allows narrowing of the linewidth of a laser oscillator and can in principle provide the generation of single-frequency pulses. Typically, single-frequency laser pulses are generated using a passively Q-switched standing-wave cavity having a relatively short length. For example, solid state Nd-lasers passively Q-switched using saturable semiconductor structures can generate single-frequency laser pulses as short as ~40 ps. Also Nd-lasers can be passively Q-switched by $Cr^{4+}$-doped materials (such as $Cr^{4+}$:YAG) or color center materials (such as $LiF:F_2^-$ crystals); however, the laser pulsewidth in this case can be much longer-ranging from ~1 s to ~10 s of ns. For generation of single-frequency pulses, it is advantageous to have a short laser cavity so that the longitudinal mode spacing is maximized and the number of longitudinal modes matching the spectral gain curve of the laser active medium is minimized. Short length of the laser cavity facilitates the generation of short laser pulses. However, the time-bandwidth relationship dictates that the laser bandwidth increases as the laser pulses are shortened. This makes short, single-frequency laser pulses undesirable for various applications where the signal of interest has a small frequency shift, e.g., coherent LIDAR applications, or the laser source is used to excite various subjects with extremely narrow spectral lines, e.g., $CO_2$ detection. The linewidth requirements can be satisfied for a pulsed laser by increasing the laser pulsewidth to hundreds of ns (while maintaining the single longitudinal mode operation), which decreases its transform-limited spectral linewidth.

FIG. 1A shows a prior art Q-switched oscillator using a standing-wave resonator. A pump source 90 provides pump light 100, which enters the resonator through a dichroic mirror 101, which is highly transmissive at the pump wavelength and highly reflective at the laser wavelength. The pump laser is incident on the gain medium/laser element 103 and is fully or partially absorbed in the laser element. The laser emission 105 escapes through the output coupler 102, which is a partial reflector at the laser wavelength. To achieve a pulsed regime of operation a Q-switch element 104 can be inserted in the cavity. Such Q-switching elements can be passive (e.g., a saturable absorber) or active (e.g., an electro-optic or acousto-optic Q-switch). The output coupler 102 can be a mirror, a surface grating, or a thick holographic (volume) grating.

Standing wave resonators typically produce short laser pulses (40 ps to ~80 ns). An inherent disadvantage of a standing wave resonator is spatial hole-burning, which can lead to generation of other longitudinal modes. To overcome the limitations of the standing-wave oscillator, one can consider a ring resonator design that can eliminate spatial hole-burning and increase the laser pulsewidth due to the fact that the laser beam passes only one time through the gain medium per roundtrip.

FIG. 1B shows a prior art ring resonator. Typically, ring resonators are based on a 4-mirror design with two dichroic concave mirrors 101 and two flat mirrors 102, 106. One of two flat mirrors serves as an output coupler 102. An "optical diode" provides unidirectional operation. An optical diode can include a non-reciprocal Faraday rotator and a reciprocal rotator (such as half-wave plate).

To achieve laser operation at a specific wavelength and decrease the laser linewidth, a narrow-bandwidth element can be incorporated into the cavity. For example, a surface grating or an intracavity etalon (or a pair of etalons) can be used. However, intracavity etalons are extremely temperature and angle-alignment sensitive elements and make the design of wavelength-stable oscillators difficult. Surface gratings have relatively low laser damage threshold and require intra-cavity beam expansion to increase spectral resolution.

It, therefore, would be advantageous to develop a ring resonator that can utilize a thick Bragg grating (TBG) as a narrow-bandwidth reflector.

SUMMARY OF THE INVENTION

The invention, in one embodiment, features a ring oscillator that incorporates a narrow-bandwidth holographic reflector (e.g., an output coupler or a high reflector). The ring oscillator can include a passive Q-switch to produce >100-ns laser pulses with transform limited linewidth. An "optical diode" can provide unidirectional ring cavity operation.

A narrowband reflector based on a holographic thick Bragg grating allows selection of the desired operating wavelength and "coarse" spectral bandwidth narrowing. For example, typical bandwidth for a holographic output coupler based on a TBG element at ~2-μm wavelength is <300 μm. Passive Q-switching provides the means for pulsed laser operation and single-longitudinal mode selection. Unidirectional operation of a ring cavity reduces the round-trip gain and the round-trip saturable loss by two times (as compared to a standing wave cavity with the same laser arrangement (laser crystal, saturable absorber, pump power and beam geometry)). Unidirectional operation can eliminate spatial hole burning as compared to a standing-wave oscillator. Longer pulses can be generated because of the gain reduction. The absence of spatial hole burning facilitates discrimination of higher order longitudinal modes.

In one aspect, there is a laser device including a pump source, a ring resonator, a gain medium disposed in the ring resonator, and a holographic output coupler to partially transmit the laser radiation. The gain medium is configured to receive radiation from the pump source and generate laser radiation.

In another aspect, there is a laser device including a pump source, a ring resonator, a gain medium disposed in the ring resonator, and a holographic high reflector. The gain medium is configured to receive radiation from the pump source and generate laser radiation.

In other examples, any of the aspects above, or any apparatus, system or device, or method, process or technique, described herein, can include one or more of the following features.

The laser radiation can be spectrally-narrow. The holographic output coupler and/or the holographic high reflector can be a thick holographic Bragg grating, or a volume Bragg grating, or a volume holographic grating. The holographic output coupler and/or the holographic high reflector can be a narrow-band, reflective holographic Bragg grating element. The holographic output coupler and/or the holographic high reflector can be configured to operate away from normal incidence at an angle of less than 10 degrees.

The ring resonator can be adapted to be a unidirectional ring resonator. The laser device can include an optical diode disposed within the ring resonator to cause unidirectional propagation of the laser radiation. The optical diode can include a Faraday rotator and a half wave plate.

In various embodiments, the laser device includes a Q-switch disposed within the ring resonator. The Q-switch can be a passive Q-switch or an active Q-switch. The Q-switch can be a saturable absorber acting as a slow-opening passive Q-switch. The Q-switch can be adapted to provide single-frequency operation in a spectral window defined by the holographic output coupler (e.g., a holographic Bragg grating element).

In certain embodiments, the gain medium and/or the pump source is solid state, gaseous, or liquid. The gain medium can be an active laser medium or a nonlinear medium. If the gain medium is an active laser medium, the laser device can include an optical diode and/or a Q-switch.

In various embodiments, the gain medium is at least one of a holmium-doped material, a thulium-doped material, an erbium-doped material, a ytterbium-erbium doped material, a ytterbium-doped material, a neodymium-doped material, a $Cr^{4+}$-doped material, a titanium-doped sapphire material, a ruby material or an alexandrite material.

The gain medium can be a holmium-doped material or a thulium-doped material, and the saturable absorber can be a $Cr^{2+}$-doped material.

The gain medium can be an erbium-doped material or a ytterbium-erbium doped material, and the saturable absorber can be a $Cr^{2+}$-, or $Co^{2+}$-, or $V^{3+}$-doped material.

The gain medium can be an ytterbium-doped material or a neodymium-doped material, and the saturable absorber can be a $Cr^{4+}$-, or $V^{3+}$-doped material or $LiF:F_2^-$ color center material.

The gain medium can be a $Cr^{4+}$-doped material, and the saturable absorber can be a $V^{3+}$-doped material.

The gain medium can be a titanium-doped sapphire material, and the saturable absorber can be a $LiF:F_2^-$ or $LiF:F_2^+$ color center material.

Examples of non-linear media include, but are not limited to, LBO, BBO, KTP and KTA crystals, periodically-poled LN, LT, KTP and RTP materials, and optically patterned GaAs materials Other aspects and advantages of the invention will become apparent from the following detailed description, taken in conjunction with the accompanying drawings, illustrating the principles of the invention by way of example only.

BRIEF DESCRIPTION OF THE TECHNOLOGY

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 1A shows a prior art Q-switched oscillator using a standing-wave resonator.

FIG. 1B shows a prior art ring resonator.

FIG. 2A-2C show various configurations for an optical parametric oscillator (OPO) laser device.

FIGS. 3A-3C show various configurations for a laser device including a passive Q-switch element and an optical diode.

DESCRIPTION OF THE INVENTION

Figure 4:
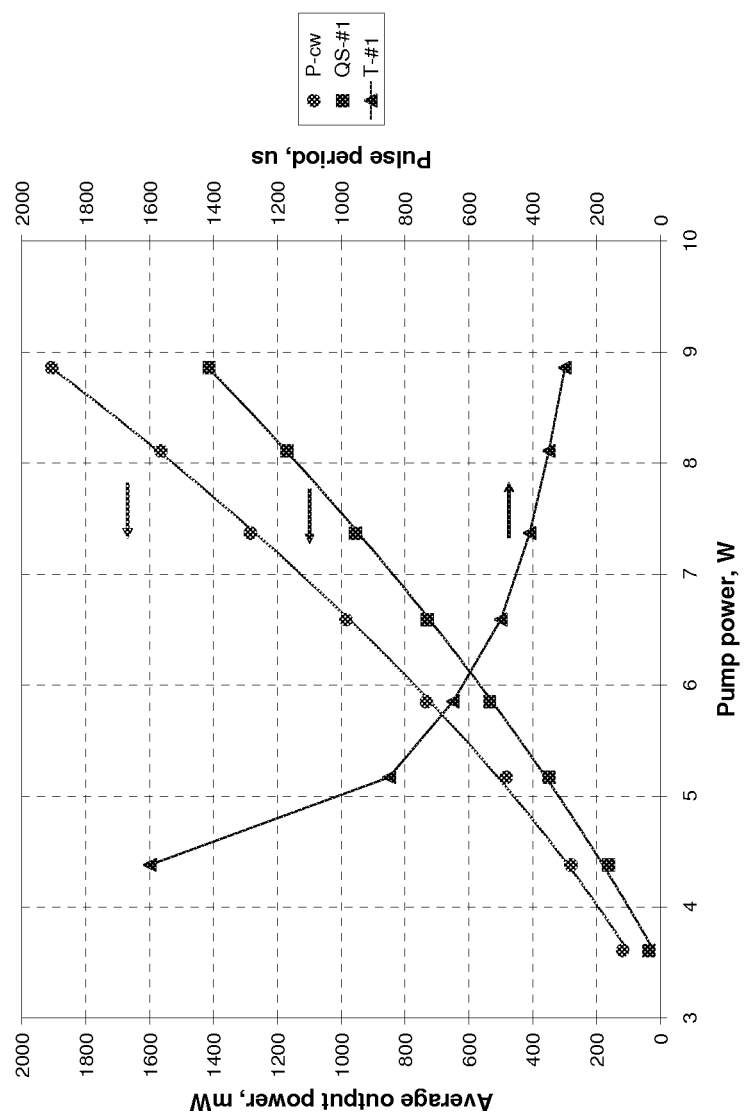
FIG. 4 shows dependence of the output power in CW and Q-switched regimes, and pulse period for a ring Ho:YLF oscillator vs. 1.9-μm pump power.

FIGS. 2A-2C show various configurations for an optical parametric oscillator (OPO) laser device including a pump source 90, a ring resonator, a gain medium 103 disposed in the ring resonator, and a holographic output coupler 110 of the ring resonator to partially transmit the laser radiation operated away from normal incidence. The gain medium 103 is configured to receive radiation from the pump source 90 and generate laser radiation. Light 100 from the pump source 90 is directed to the laser gain medium 103. Mirrors 101 can be dichroic mirrors, highly transmissive at the pump wavelength and highly reflective at laser wavelength. Mirrors 101 can be flat or curved mirrors. Intracavity lens 109 can be installed to provide resonator stability. Mirrors 106 are high reflectors at the laser wavelength. Output beam 105 passes through output coupler 110.

FIGS. 3A-3C show various configurations for a laser device including a passive Q-switch element 107, an optical diode 108 (e.g., a Faraday rotator and polarization rotator), and a lens 109. Pump light 100 from pump source 90 can be directed at the laser element 103 through one or both dichroic mirrors 101, which are highly transmissive at the pump wavelength and highly reflective at the laser wavelength. Mirrors 106 are high reflectors at the laser wavelength. The laser emission 105 exits the laser cavity through the output coupler 110 (e.g., a TBG), which is a partial reflector at the laser wavelength. Intracavity focusing lens 109 is used to make a stable laser resonator. By varying the lens focal length, one can manipulate the size of the laser mode in the laser crystal. Optical diode 108 provides unidirectional operation of the ring oscillator and can be set to clockwise or counter-clockwise operation. To achieve pulsed regime of operation a passive Q-switch element 107 is inserted in the cavity. The Q-switch element can be a saturable absorber and for a Ho:YLF oscillator example can be based on $Cr^{2+}$-doped optical material.

The resonator length can be a few cm to up to a few meters. In one embodiment, the resonator length is about 31 cm. The output coupler can be a TBG element providing ~85% peak reflectivity at 2051 nm at 1 deg Bragg angle. The TBG element can define specific, narrow-wavelength window where the laser operation is possible. However, the single frequency regime of operation is not guaranteed as the TBG spectral bandwidth is ~300 pm (FWHM) and the mode spacing for a 31 cm ring resonator is ~14 pm. Therefore, the TBG element can be considered as a "coarse" wavelength selector.

Figure 5:
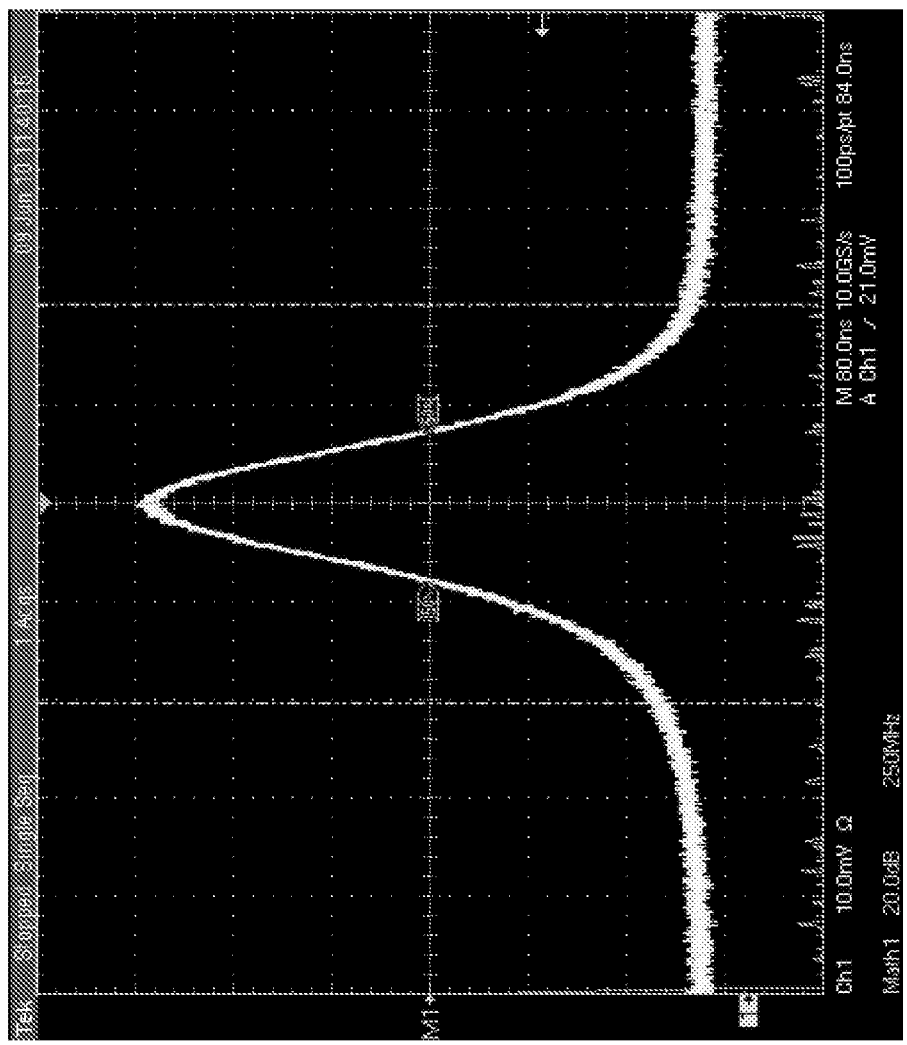
FIG. 5 shows an oscillogram of a single-frequency pulse.

Single-frequency regime of operation can be achieved by adding a passive slow-opening Q-switch, which provides additional means for longitudinal mode selection. The operation of the ring Ho:YLF oscillator in the Q-switched regime can be characterized with the $Cr^{2+}$:ZnSe saturable absorber having the initial transmission T=~94.5%. Dependence of the output power in CW and Q-switched regimes, and pulse period for a ring Ho:YLF oscillator vs. 1.9-μm pump power is shown in FIG. 4. The laser pulsewidth was measured to be ~140-150 ns at pump level of ~9 W. Generated energy per pulse was ~0.4 mJ at pump level of ~9 W. FIG. 5 shows a typical oscillogram of a single-frequency pulse.

Various solid state laser materials can be used. Examples include, but are not limited to, are: 1) Nd-doped lasers operating at ~1 μm, 2) Yb-doped lasers operating at near 1 μm 3) Er-doped lasers operating at ~1.5-1.6 μm, 4) Tm-doped lasers operating at 1.9-2.1 μm, 5) Ho-lasers operating at ~2.0-2.1 μm, 6) Ti:sapphire lasers operating at 0.69-1.1 μm, and 7) $Cr^{2+}$:ZnSe or $Cr^{2+}$:ZnS lasers operating at 2.0-3.0 μm range.

A volume Bragg grating, a thick holographic grating, a thick Bragg grating, a volume holographic grating, or a three-dimensional Bragg grating can be a Bragg grating different from a surface diffraction grating, which can be holographic but is two-dimensional.

Figure 6:
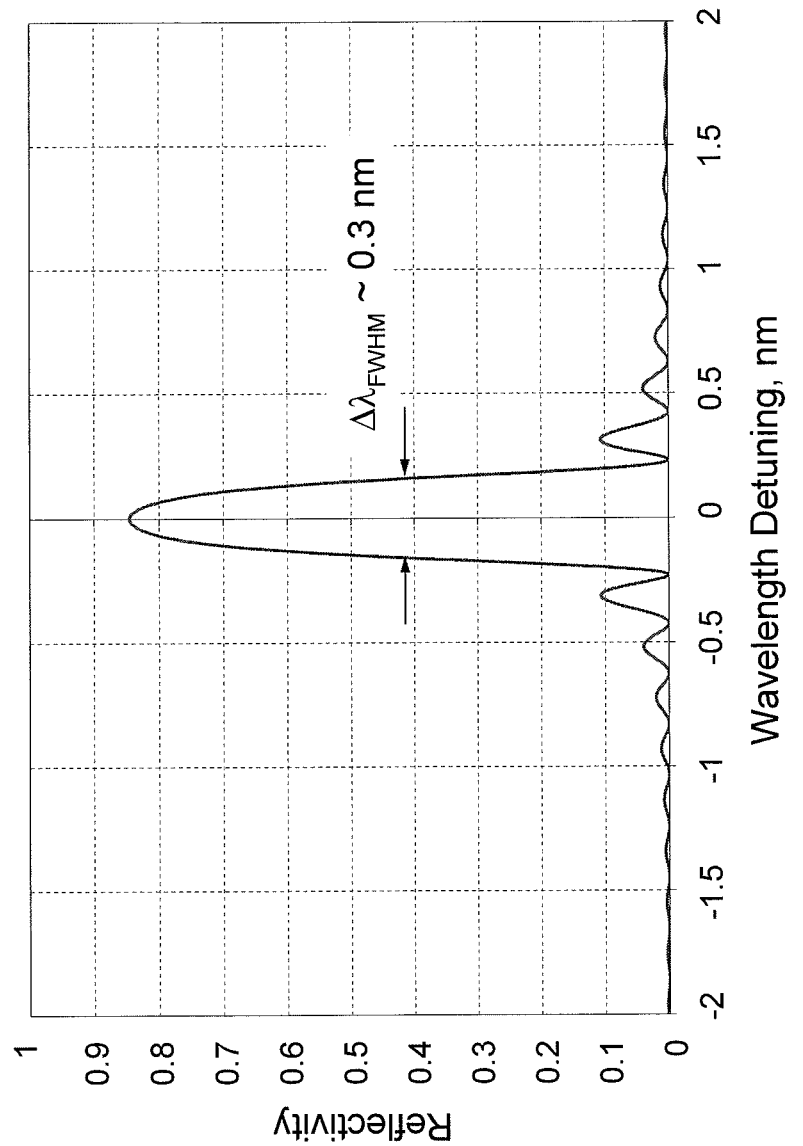
FIG. 6 shows a modeled reflectivity curve for a partial TBG reflector designed to operate at 2051 nm with the spectral bandwidth of ~0.3 nm at FWHM.

TBGs (for example, holographic volume Bragg gratings in PTR glass) can be the best option for a narrow-band resonant reflector. Such TBGs have high damage threshold, provide spectrally narrowband reflection and their spectral selectivity does not depend on the beam size. TBGs can be designed as transmissive or reflective elements. As compared to narrow-band transmissive Bragg gratings, which have very narrow angular acceptance, reflective Bragg gratings operated near normal incidence provide the narrowest spectral bandwidth and maximum angular acceptance. FIG. 6 shows a modeled reflectivity curve for a partial TBG reflector designed to operate at 2051 nm with the spectral bandwidth of ~0.3 nm at FWHM. However, as such reflectors are designed to operate at normal incidence, it is not obvious how to incorporate them in a ring resonator.

Figure 7A:
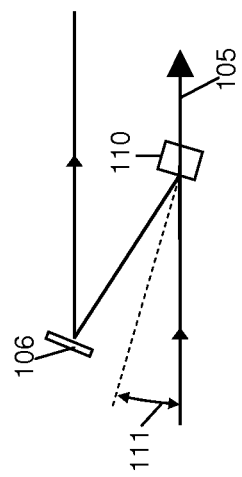
FIGS. 7A and 7B show the angle of incidence with respect to a holographic output coupler.
Figure 7B:
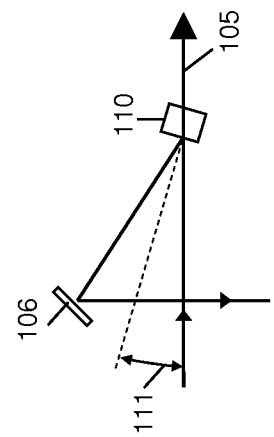

A TBG reflector can be incorporated into a ring resonator by utilizing a thick grating element, which is designed to operate not at normal incidence but at a small Bragg angle, for example, less than 10 degrees. In some embodiments, the angle is less than 5 degrees. In certain embodiments, the angle is less than 4 degrees. In certain embodiments, the angle is about 0.5-2 degrees. Smaller or larger angles can be used depending on the application. Small deviation (a few degrees) of the design Bragg angle (BA) from normal incidence affects the angular acceptance of a TBG element but can have almost no effect on its spectral bandwidth. FIGS. 7A and 7B show the angle of incidence 111 for a holographic output coupler 110 for two different configurations of a ring laser. The TBG reflector has its largest angular acceptance bandwidth as long as the design Bragg angle is not exceeding the "threshold" value. The "threshold" Bragg angle for a reflective TBG can be defined as:

$$\tan^2\theta_0 = \frac{2\delta\lambda^{HWFZ}}{3\lambda},$$

where $\delta\lambda^{HWFZ}$ is the wavelength difference between the central maximum and the first minimum for the diffraction efficiency dependence vs. wavelength detuning and λ is the design wavelength. Based on the data from FIG. 6, $\delta\lambda^{HWFZ}$ ~0.23 nm, λ=2051 nm), the "threshold" angle is ~0.5 deg.

Figure 8:
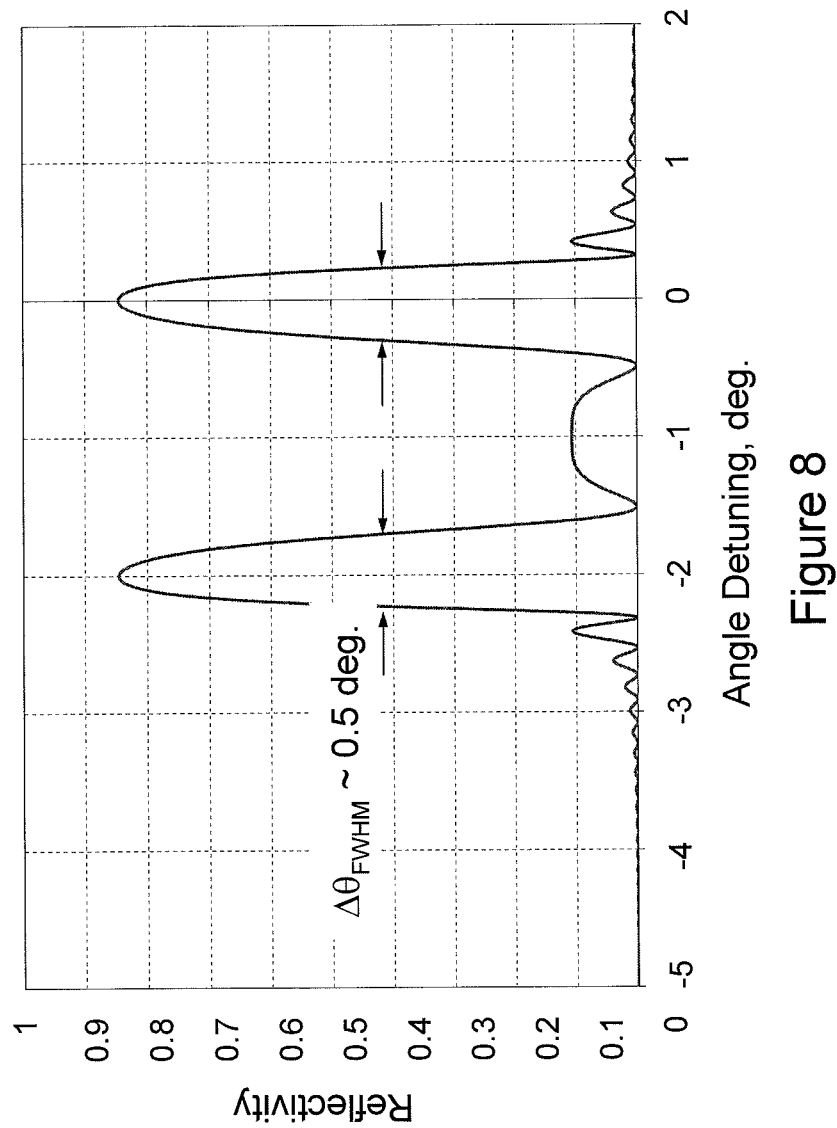
FIG. 8 shows a modeled reflectivity curve for a TBG reflector designed to operate at 2051 nm at Bragg angle of 1 degree.

FIG. 8 shows a modeled reflectivity curve for a TBG reflector designed to operate at 2051 nm at Bragg angle of 1 degree. All other grating parameters are the same as in FIG. 6. If angle detuning from the design Bragg angle is considered, there are two distinct reflectivity peaks positioned at Bragg angle (Δθ=0) and at twice Bragg angle (Δθ=2*BA=2 deg). Each peak has angular bandwidth of ~0.5 deg (FWHM).

If the design Bragg angle is increased beyond the threshold value, the angular acceptance bandwidth rapidly decreases. For example, the angular bandwidth for Bragg reflection peak (FWHM) is ~9 mrad for BA=1 deg, ~4.3 mrad at BA=2 deg, and ~2.2 mrad at BA=4 deg. Small angular acceptance of TBG reflector combined with resonator misalignment sensitivity can lead to fluctuation of the operating laser wavelength that is not desirable.

Larger angular bandwidth for the Bragg reflector is advantageous as it allows to design less misalignment sensitive ring resonators, improves wavelength stability and simplifies the laser assembly. In addition, the TBG output coupler can be designed to operate at an angle of incidence large enough to provide sufficient angular separation between the incident and reflected beams so that ring resonator can be constructed. Angle of incidence of 1-2 deg can be a good compromise value. In general, the angle can be smaller (between 0 deg and 1 deg) or larger—up to 45 deg. In certain embodiments, the angle is less than 10 degrees, less than 5 degrees, or less than 4 degrees. The ultimate upper limit on the design Bragg angle for a TBG element is defined by the angular divergence of the lasing beam in a particular resonator. The angular acceptance bandwidth of TBG reflector typically is not less than the angular divergence of the laser mode in the resonator.

Figure 9:
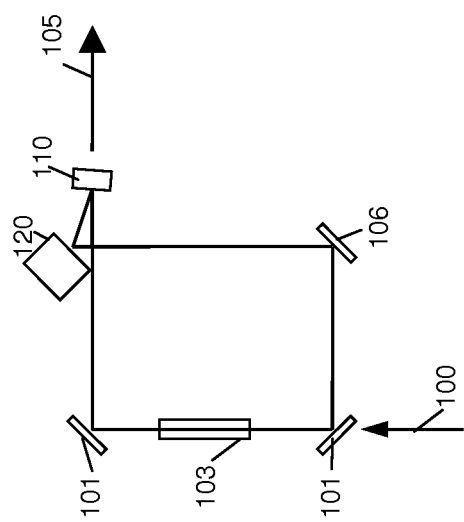
FIG. 9 shows a configuration of a ring resonator where the high reflector is a holographic reflector.

FIG. 9 shows a configuration of a ring resonator where the high reflector 120 is a holographic reflector. Output coupler 110 need not be a holographic reflector, and can instead be a conventional output coupler mirror.

The resonator design can be applied to solid state lasers and non-linear devices, such as optical parametric oscillators (OPOs). Active laser media include laser crystals, glasses, ceramics, which can be doped with various laser ions. The active laser medium can be pumped with one or two beams of radiation. Nonlinear media include nonlinear crystals, periodically-poled and optically-patterned nonlinear materials. A resonator including a non-linear laser media need not include an optical diode or a Q-switch. In some embodiments, the non-linear laser media can be pumped with one beam. A resonator including a non-linear laser media can include a holographic output coupler and/or a holographic high reflector configured to operate away from normal incidence at an angle of less than 10 degrees.

While the invention has been particularly shown and described with reference to specific illustrative embodiments, it should be understood that various changes in form and detail may be made without departing from the spirit and scope of the invention.

The invention claimed is:
1. A laser device comprising:
a pump source;

a ring resonator;
a gain medium disposed in the ring resonator, the gain medium configured to receive radiation from the pump source and generate laser radiation;
an optical diode disposed within the ring resonator to cause unidirectional propagation of the laser radiation;
a passive Q-switch disposed within the ring resonator; and
a three-dimensional holographic grating output coupler incorporated in the ring resonator, the three dimensional holographic grating output coupler being a narrow-band, reflective thick Bragg grating element configured to transmit the laser radiation at a predetermined wavelength.

2. The laser device of claim 1 wherein the three-dimensional holographic grating output coupler is configured to operate away from normal incidence at an angle of less than 10 degrees.

3. The laser device of claim 1 wherein the optical diode comprises a Faraday rotator and a half-wave plate.

4. The laser device of claim 1 wherein the Q-switch is a saturable absorber acting as a slow-opening passive Q-switch.

5. The laser device of claim 4 wherein the Q-switch is adapted to provide single-frequency operation in a spectral window defined by the three-dimensional holographic grating output coupler.

6. The laser device of claim 1 wherein the gain medium is solid state.

7. The laser device of claim 1 wherein the gain medium is an active laser medium.

8. The laser device of claim 1 wherein the gain medium is a nonlinear medium and the three-dimensional holographic grating output coupler is configured to operate away from normal incidence at an angle of less than 10 degrees.

9. The laser device of claim 1 wherein the gain medium includes at least one of a holmium-doped material, a thulium-doped material, an erbium-doped material, a ytterbium-erbium doped material, a ytterbium-doped material, a neodymium-doped material, a $Cr^{4+}$-doped material, a titanium-doped sapphire material, a ruby material or an alexandrite material.

10. The laser device of claim 1 wherein the gain medium includes a holmium-doped material or a thulium-doped material and the passive Q-switch includes $Cr^{2+}$-doped material.

11. The laser device of claim 1 wherein the gain medium includes an erbium-doped material or a ytterbium-erbium doped material and the passive Q-switch includes a $Cr^{2+}$- or $Co^{2+}$- or $V^{3+}$-doped material.

12. The laser device of claim 1 wherein the gain medium includes a ytterbium-doped material or a neodymium-doped material and the passive Q-switch includes a $Cr^{4+}$- or $V^{3+}$-doped material or $LiF:F_2^-$ color center material.

13. The laser device of claim 1 wherein the gain medium includes a $Cr^{4+}$-doped material and the passive Q-switch includes $V^{3+}$-doped material.

14. The laser device of claim 1 wherein the gain medium includes a titanium-doped sapphire material and the passive Q-switch includes a $LiF:F_2^-$ or $LiF:F_2^+$ color center material.

15. A laser device comprising:
a pump source;
a ring resonator;
a non-linear gain medium disposed in the ring resonator, the non-linear gain medium configured to receive radiation from the pump source and generate laser radiation; and
a three-dimensional holographic grating output coupler incorporated in the ring resonator, the three dimensional holographic grating output coupler being a narrow-band, reflective thick Bragg grating element configured to operate away from normal incidence angle at an angle of less than 10 degrees to partially transmit the laser radiation at pulsewidth ranging from 10 to 500 nanoseconds.

16. The laser device of claim 15 wherein the non-linear gain medium includes LBO, BBO, KTP or KTA crystals, periodically-poled LN, LT, KTP or RTP materials, or optically patterned GaAs materials.

* * * * *